United States Patent [19]

Duelli

[11] Patent Number: 4,919,105
[45] Date of Patent: Apr. 24, 1990

[54] DEVICE FOR IMPROVING MIXTURE DISTRIBUTION IN AN INTAKE TUBE OF A COMBUSTION ENGINE

[75] Inventor: Heinz Duelli, Hohenems, Austria

[73] Assignee: Robert Bosch GmbH, Stuttgart, Fed. Rep. of Germany

[21] Appl. No.: 285,676

[22] Filed: Dec. 16, 1988

[30] Foreign Application Priority Data

Feb. 25, 1988 [DE] Fed. Rep. of Germany ....... 3805927

[51] Int. Cl.$^5$ ............................................. F02M 29/00
[52] U.S. Cl. .................................. 123/590; 123/549; 48/189.2
[58] Field of Search ...................... 123/590, 543, 549; 48/189.2

[56] References Cited

U.S. PATENT DOCUMENTS

| | | | |
|---|---|---|---|
| 3,625,190 | 12/1971 | Boissevain | 123/549 |
| 4,047,511 | 9/1977 | Takagi | 123/549 |
| 4,181,111 | 1/1980 | Sanada et al. | 123/549 |
| 4,246,880 | 1/1981 | Henke et al. | 123/549 |
| 4,387,291 | 6/1983 | Keppel | 123/543 |
| 4,646,703 | 3/1987 | Bradford et al. | 123/549 |
| 4,834,053 | 5/1989 | Van Der Ploey et al. | 123/549 |

OTHER PUBLICATIONS

Handbuch Energie, Herausgegeben von Th. Bohn 1983, Band 2 Verdrängermaschinen, Teil II Hubkolbenmotoren, pp. 170–173.
Fortschrittberichte VD1, Reihe 12, Nr. 62, Georg Pachta-Reyhofen Wandfilmbildung und Gemischverteilung . . . , pp. 62–64, 187–190.

Primary Examiner—E. Rollins Cross
Attorney, Agent, or Firm—Edwin E. Greigg

[57] ABSTRACT

A device for improving a fuel-air mixture distribution in multi-cylinder internal combustion engines, in which a mixture forming device (carburetor, central injection unit) must supply more than one cylinder. By means of the device a quantitatively and qualitatively uniform distribution of the air-fuel mixture to the various cylinders is effectively improved. This more-uniform distribution of the mixture is obtained by combining a plurality of nail-like protrusions and a guide wall downstream of the fuel-air mixture device at which an effective transfer of heat produced by a heating element takes place, with which the flow condition are varied prior to the division of the intake tube into intake line arms. It is particularly effective to dispose the device at the "hot spot" of downdraft intake tubes in multi-cylinder engines.

28 Claims, 2 Drawing Sheets

DEVICE FOR IMPROVING MIXTURE DISTRIBUTION IN AN INTAKE TUBE OF A COMBUSTION ENGINE

BACKGROUND OF THE INVENTION

The invention is based on a device for improving the mixture distribution in an intake tube of a multi-cylinder internal combustion engine of a motor vehicle. Such a device is already known which improves the homogenization of an air-fuel mixture flowing from a mixture forming location through the intake tube to the engine. The device is located in the intake tube, primarily at a location of maximum deposition of individual fuel droplets on the wall. The device comprises a cap in the intake tube, which acts as the basic surface; nail-like protrusions protrude from it into the intake tube. In the literature, this device is often called a "fakir's pre-heating cap". The device is typically heated electrically and serves to reduce the formation of a film of fuel on the wall, especially during cold starting an in the warmup phase. The nail-like protrusions have little if any effect on the flow conditions in the intake tube. They are not in a position to affect the flow of the air-fuel mixture in the direction toward individual cylinders.

On the other hand, ribs approximately 3 mm high, disposed inside the intake tube on a wall thereof, are already known. They can be attached in such a way that as needed, they serve to divert the fuel film on the wall, or they can cause the wall film to tear off. Once again, however, the ribs have no significant effect on the flow conditions.

OBJECT AND SUMMARY OF THE INVENTION

The device according to the invention for improving the mixture distribution in an intake tube has at least two substantial advantages over the prior art. One advantage is that a fuel droplet deposited from the fuel-air mixture onto the device is immediately vaporized, which effectively prevents formation of a fuel film on the wall. Another advantage is that the air-fuel mixture can be deflected in a predeterminable manner by means of the at least one guide wall. Disposing the guide wall between the protrusions assures that it is heated sufficiently that fuel droplets cannot adhere to it; moreover, the guide wall is optimally positioned where the distribution of the mixture emerging from the mixture forming site can be effectively influenced in a predeterminable manner.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
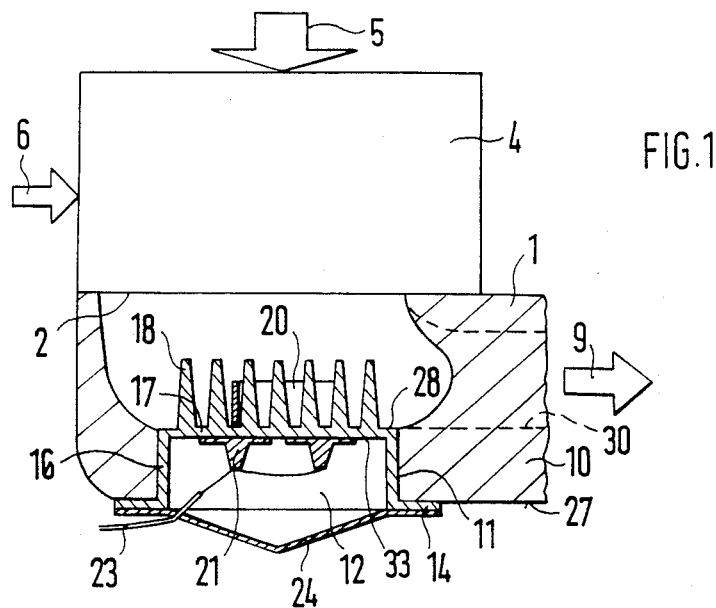
FIGS. 1 and 4 each show a longitudinal section through a portion of the intake tube, each having a device in accordance with the invention, shown by way of example.

In FIGS. 1-7, elements that are the same and have the same function are identified by the same reference numerals. FIG. 1 is a section through a portion of an intake tube 1 of a multi-cylinder internal combustion engine. An inflow opening 2 that is open at the top is located at one end of the intake tube. A mixture forming device 4 is located above the inflow opening 2 and communicates with the intake tube 1. This device 4 may be either a carburetor or a central injection unit. An air inflow area 5 and a fuel inflow area 6 are located at the mixture forming device 4. A device 12 according to the invention for improving the mixture distribution is disposed in the lower portion of the intake tube 1 in an opening 11 in the intake tube bottom 10, in such a way that the bottom opening 11 is closed by the device 12. An air-fuel mixture formed in the mixture forming device 4 flows through the inflow opening 2 into the intake tube 1, where at least some of the mixture flows through the operative region of the device 12; then at subsequent branches 7, the mixture divides into a plurality of intake line arms 8. The mixture flow in the intake line arms 8 (FIG. 2) is symbolized in the drawing by arrows 9.

Figure 2:
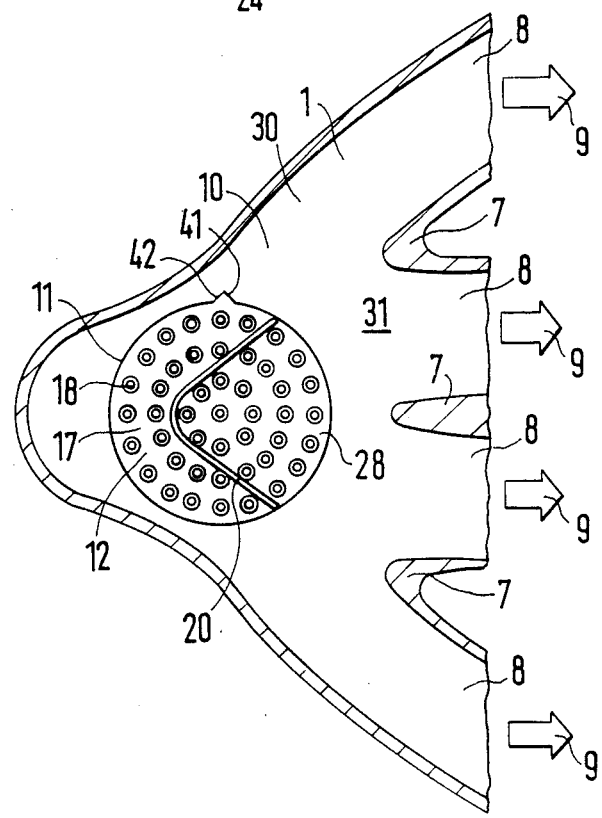
FIGS. 2, 3, 5, 6 and 7 show plan views on a cut-away portion of the intake tube having the device, which as an example is shown, sometime only in part, in five different embodiments, each in an identical intake tube portion.
Figure 3:
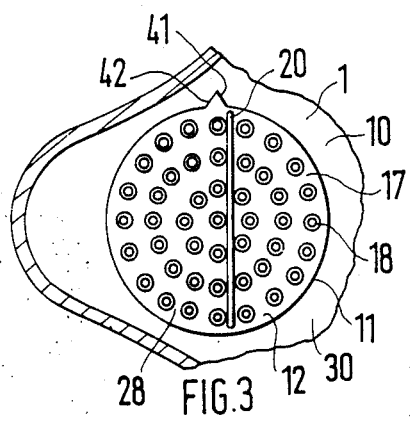
Figure 6:
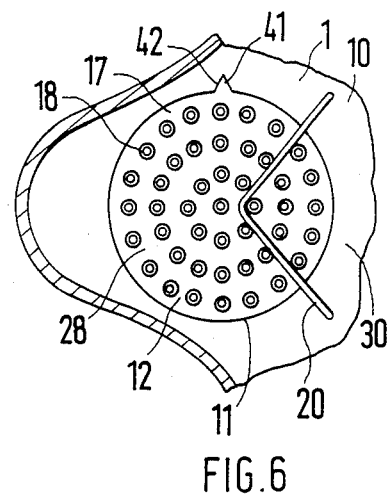
Figure 4:
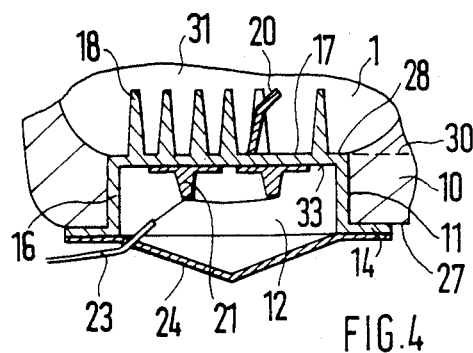
Figure 5:
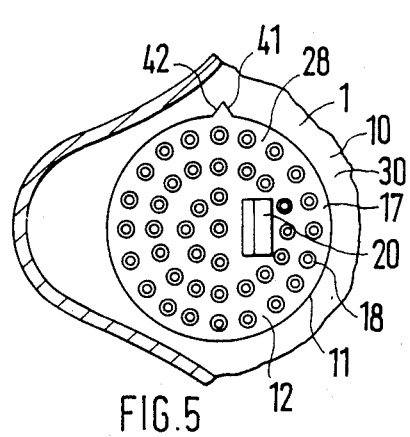
Figure 7:
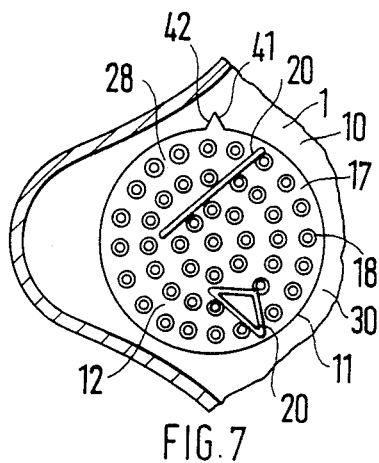

The device 12 includes a flange 14, a cylindrical part 16, a bottom face 17, quill- or nail-like protrusions 18, at least one guide wall 20, one or more heating elements 21, an electrical supply line 23 and a covering 24. The guide wall 20 protrudes outwardly from the bottom 17 with the ends of the guide walls directed outwardly toward the intake tube walls and in a direction toward the branches 7 which assists in guiding the fuel-air mixture from the inflow inlet 2 to the plurality of intake line arms 8. The cylindrical part 16 is located inside the bottom opening 11. The length of the cylindrical part is selected such that on the one hand, the flange 14 comes to rest on an underside 27 of the intake tube 1, while on the other a surface 28 of the bottom face 17 is located approximately in the same plane as an inner bottom face 30 of the intake tube. The nail- or quill- like protrusions 18 rise in a known manner from the bottom face 17. The protrusions 18 are relatively long, pin-like, generally round formations of relatively small diameter. The protrusions 18 protrude out of the bottom face 17 into the interior 31 of the intake tube. The heating elements 21 are disposed on an underside 33 of the bottom face 17, facing the surface 28. The device 12 may be heated with exhaust gas or coolant, rather than with the heating elements 21, but this alternative is not shown in the drawing. The heating elements 21 are suppied with electrical energy via the electrical supply line 23. To protect the heating elements from outside influences, the heating elements 21 are covered with the covering 24. The device 12 and the covering 24 are joined to the intake tube 1 by suitable connecting elements, typically screws. For the sake of simplicity, the connecting elements are not shown in the drawing. In the case of a downdraft intake tube system, the device is favorably disposed in the region vertically below the mixture forming device 4, as shown in the drawing. The guide wall 20 is located in the vicinity between the protrusions 18. The guide wall may, as needed, be joined to the remainder of the device. Some possibilities in this respect are as follows: Clamping it in place between the protrusions 18; welding or glueing it to the bottom face 17 at one or more points; welding or glueing it to one or more of the protrusions 18; joining it to the bottom face 17 or the protrusions 18 by suitable connecting elements, such as screws. However, the guide wall may instead be integral with the bottom face 17 from a single component, for instance by metal-cutting machining, deformation or casting. The guide wall, like the protrusions 18, extends to a variable distance into the intake tube interior 31. As needed, the guide wall 20 and/or the protrusions 18 can extend over the entire cross section of the intake tube interior 31, so that only individual, intentionally selected gaps remain. Preferably, the guide wall 20 has a height of approximately 3 mm to 30 mm, measuring from the surface 28. The guide wall 20 may be disposed such that no space remains at any point between it and the surface 28 of the bottom face 17, or such that some space remains at some points, or such there is no direct communication at any point between the guide wall 20 and the surface 28 of the bottom face 17. In the view at right angles to the surface 28, such as that shown in FIGS. 2, 3 and 5-7, the guide wall 20 may differ in appearance. It may either be straight, as shown in FIG. 3, or curved a single time, for instance into a V or U as shown in FIG. 2, or curved several times, though this is not shown in the drawings. The guide wall 20 need not necessarily stand vertically on the surface 28 of the bottom face 17 as shown in FIGS. 1-3, 6 and 7; it may instead be slanted, as shown for instance in FIGS. 4 and 5. It may be located only in the region between the protrusions 18, as shown in the plan view of FIGS. 2, 3 and 5, or it may protrude to a variable extent out of this region, as shown in the plan view of FIG. 6. Instead of only one guide wall 20, two guide walls may also be provided, as shown in FIG. 7, or more than two guide walls may be provided (not shown in the drawings). If there is a plurality of guide walls, then they need not all look alike or be disposed identically. As needed, the at least one guide wall 20 may be a plate of approximately the same thickness throughout, or it may be shaped in a streamlined manner, and/or, especially in the case where it is cast, it may become thinner as the distance from the basic body increases.

In multi-cylinder engines, in which more than one cylinder must be supplied from the mixture forming device 4, sometimes considerable differences arise in the supply of fuel to the various cylinders. Aside from the difference in quantity distributed to the cylinders, they are also differences in quality among these quantities. This is because the part of the mixture comprising vapor droplets and film, because of their boiling points, derives from different fuel components. To be able to vary the distribution of the fuel mixture to the various cylinders, the device 12 should be disposed upstream of where the intake tube divides into individual intake line arms 8. Previously, in downdraft intake tubes, a heating device has been disposed in the intake tube 1 on its bottom 10, opposite the inflow opening 2, below the mixture forming site 4. Yet this is also the site where the mixture distribution can be effectively varied by means of one or more guide walls. It is particularly favorable to provide that as a result of the disposition of the at least one guide wall 20 as described herein, this guide wall is also heated, causing the fuel droplets that strike the guide wall to be evaporated as well. The most favorable shape for the guide wall depends on several factors, such as on the form and embodiment of the intake tube 1 and intake line arms 8, the number of cylinders, and the ignition sequence of the individual cylinders. The shape and number of the at least one guide wall 20 must therefore be designed separately for every engine and every intake tube. It is favorable to dispose the at least one guide wall 20 such that any fuel film that may form on the wall cannot back up upstream of the guide wall 20.

In the exemplary embodiments shown in the drawing, the device 12 is located partly in the bottom opening 11 of the intake tube 1. However, embodiments are also possible in which the device 12 is located in a depression on the intake tube bottom 10, without having to open the intake tube bottom toward the outside; this is not shown in the drawings.

It is favorable to shape the device such that it cannot be installed incorrectly by mistake. In the exemplary embodiments shown, this is accomplished by means of a protruding tab 41 on the basic body 17, which engages a notch 42 in the bottom opening 11.

It is particularly advantageous for the basic body 17, the nail-like protrusions 18 and the at least one guide wall 20 to be manufactured from a material having good thermal conductivity, and with a surface that promotes heat transfer, and for these parts at the same time to be thermally insulated as much as possible from the intake tube 1.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A device for improving a fuel-air mixture distribution in a portion of an intake tube for an internal combustion engine, which comprises a fuel-air mixture distribution device (12) having a basic body (17), relatively steep, individual separately spaced upright, nail-like protrusions (18) protruding from said basic body (17) into said portion of the intake tube, a heating means connected to said fuel-air mixture distribution device for heating said protrusions and said basic body, and at least one fuel-air mixture guide wall (20) connected to said fuel-air mixture distribution device (12), said at least one fuel-air mixture guide wall protruding from said fuel-air mixture distribution device substantially in a direction of said protrusions (18), and disposed among and within an immediate vicinity of said protrusions (18) that extend into the intake tube portion.

2. A device as defined by claim 1, in which said at least one fuel-air mixture guide wall (20) is disposed between at least some of the protrusions (18).

3. A device as defined by claim 1, in which said at least one fuel-air mixture guide wall (20) is clamped in place between at least some of the protrusions (18).

4. A device as defined by claim 2, in which said at least one air-fuel mixture guide wall (20) is clamped in place between at least some of the protrusions (18).

5. A device as defined by claim 1, in which said at least one air-fuel mixture guide wall (20) is connected at at least one location to at least one protrusion (18).

6. A device as defined in claim 2, in which said at least one air-fuel mixture guide wall (20) is connected at at least one location to at least one protrusion (18).

7. A device as defined by claim 1, in which said at least one air-fuel guide wall mixture (20) is connected at at least one location to the basic body (17).

8. A device as defined by claim 2, in which said at least one air-fuel mixture guide wall (20) is connected at at least one location to the basic body (17).

9. A device as defined by claim 1, in which said at least one fuel-air mixture guide wall (20) is made integral with the basic body (17) from one workpiece.

10. A device as defined by claim 2, in which said at least one fuel-air mixture guide wall (20) is made integral with the basic body (17) from one workpiece.

11. A device as defined by claim 1, in which no free space remains between said at least one fuel-air mixture guide wall (20) and the basic body (17).

12. A device as defined by claim 2, in which no free space remains between said at least one fuel-air mixture guide wall (20) and the basic body (17).

13. A device as defined by claim 1, in which a free space remains at least at some points between said at least one fuel-air mixture guide wall (20) and the basic body (17).

14. A device as defined by claim 2, in which a free space remains at least at some points between said at least one fuel-air mixture guide wall (20) and the basic body (17).

15. A device as defined by claim 1, in which said at least one fuel-air mixture guide wall (20) has the shape of a thin plate.

16. A device as defined by claim 2, in which said at least one fuel-air mixture guide wall (20) has the shape of a thin plate.

17. A device as defined by claim 1, in which said at least one fuel-air mixture guide wall (20) has a nonuniform thickness.

18. A device as defined by claim 2, in which said at least one fuel-air mixture guide wall (20) has a nonuniform thickness.

19. A device as defined by claim 1, which comprises a plurality of fuel-air mixture guide walls (20).

20. A device as defined by claim 2, which comprises a plurality of fuel-air mixture guide walls (20).

21. A device as defined by claim 1, in which said at least one fuel-air mixture guide wall (20) is slanted relative to said basic body (17).

22. A device as defined by claim 2, in which said at least one fuel-air mixture guide wall (20) is slanted relative to said basic body (17).

23. A device as defined by claim 1, which comprises a mixture forming device (4) disposed on said intake tube portion in a region upstream of said device (12).

24. A device as defined by claim 2, which comprises a mixture forming device (4) disposed on said intake tube portion in a region upstream of said device (12).

25. A device as defined by claim 1, in which said at least one fuel-air mixture guide wall (20) has a height, measuring from a surface (28) of said basic body (17), of about 3 mm to about 30 mm.

26. A device as defined by claim 2, in which said at least one fuel-air mixture guide wall (20) has a height, measuring from a surface (28) of said basic body (17), of about 3 mm to about 30 mm.

27. A device as defined by claim 1, in which said at least one fuel-air mixture guide wall (20) comprises material having good thermal conductivity and which provides a good heat transfer.

28. A device as defined by claim 2, in which said at least one fuel-air mixture guide wall (20) comprises material having good thermal conductivity and which provides a good heat transfer.

* * * * *